United States Patent Office 3,069,998
Patented Dec. 25, 1962

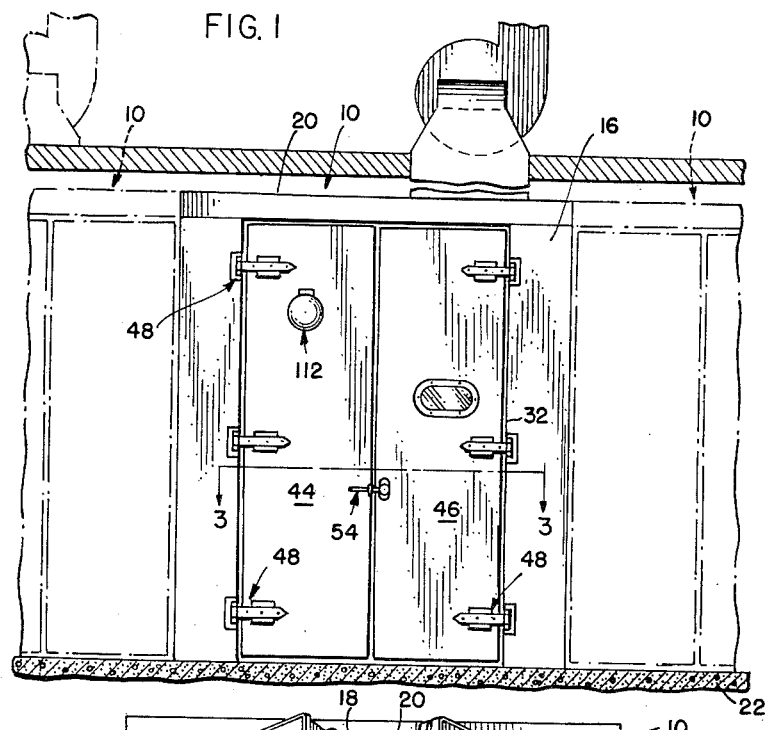
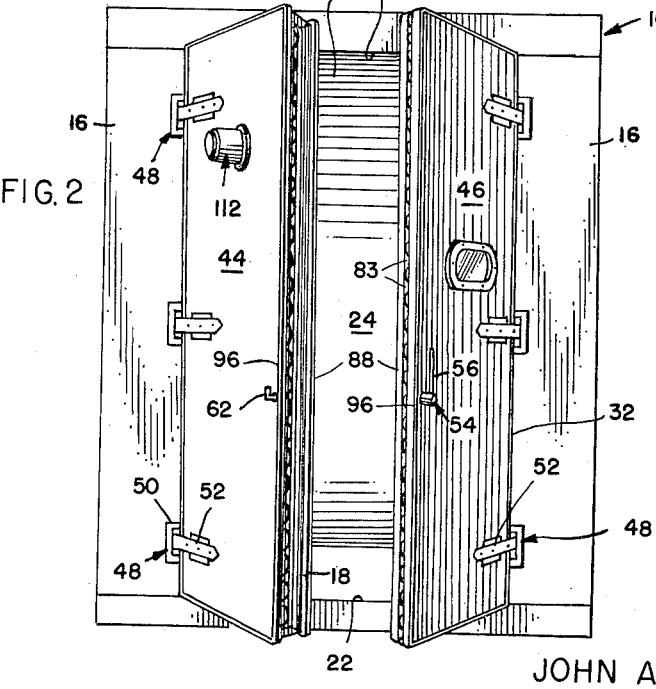

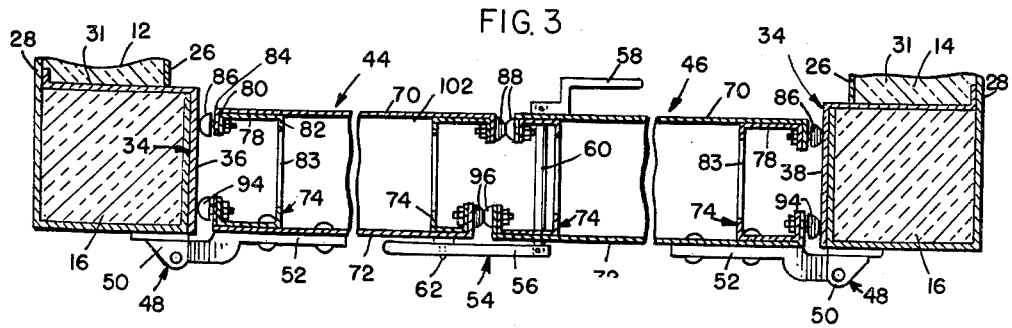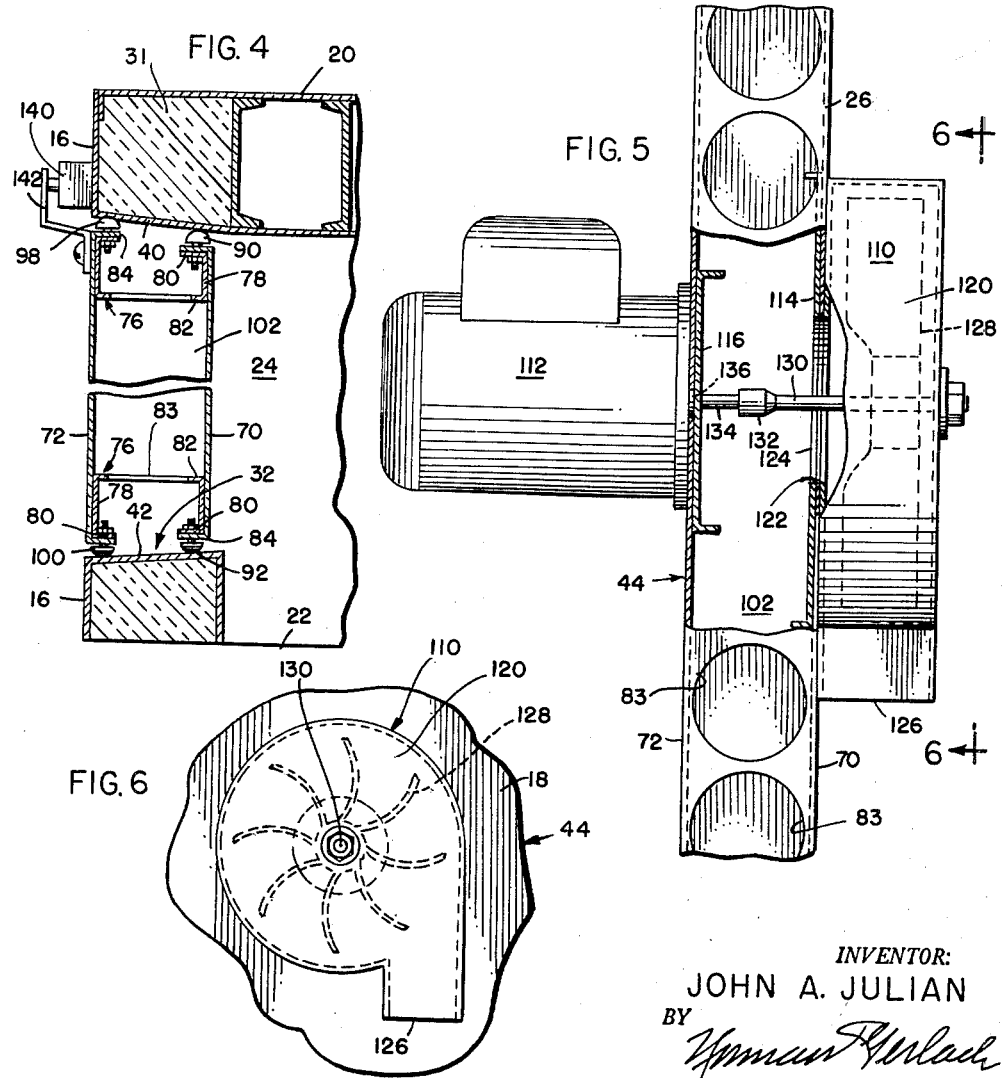
INVENTOR:
JOHN A. JULIAN

3,069,998
APPARATUS FOR PREVENTING EXFILTRATION OF SMOKE-LADEN AIR FROM SMOKEHOUSE ENCLOSURES
John A. Julian, Kenilworth, Ill., assignor to Julian Engineering Company, Chicago, Ill., a corporation of Illinois
Filed June 20, 1961, Ser. No. 118,330
14 Claims. (Cl. 99—259)

The present invention relates generally to smokehouses in which meat products, principally those of the sausage variety, are subjected to temperature and humidity control and to the application of smoke in prescribed densities and in steps according to a predetermined schedule of operation to the end that a uniform product is obtained having the desired physical characteristics of taste, color, consistency, appearance, etc. More particularly, the invention relates to an apparatus or system for preventing exfiltration of smoke-laden air from the interior of a smokehouse around the edges of doors of the smokehouse.

In my copending United States patent application Serial No. 111,780, filed on May 22, 1961 and entitled "Apparatus for Preventing Exfiltration of Smoke-Laden Air From Smokehouse Enclosures," there has been disclosed an apparatus or system for preventing exfiltration of smoke-laden air from the interior of a smokehouse. Generally speaking, the system comprises a smokehouse door opening in the form of hollow intercommunicating jambs including vertical jambs and an interconnecting top jamb between the upper ends of the vertical jambs. Spaced inner and outer doors are adapted, when closed, to bridge these jambs and establish in combination therewith a narrow vestibule. By means of a motor-driven blower and a series of ducts, as well as openings which establish communication between the vestibule and the interior of the aforementioned interconnecting hollow jambs, smoke-laden air is continuously evacuated from the jambs to pull the air from the vestibule and thus maintain a subatmospheric pressure within the vestibule so that if there does exist any room for leakage of air around the outside door edges, the leakage will be that of outside air being pulled into the vestibule rather than that of smoke-laden air escaping from the vestibule.

The present invention is designed as an improvement upon the system of my above referred to copending application in that it represents a simplification of the system both with respect to the amount of equipment employed and the amount of modification that need be made to the smokehouse to adapt the same to the present system, to say nothing of the reduced cost of installation. According to the present invention, little or no modification of the smokehouse, including its door opening, need be made and the use of double, independently movable doors which establish a vestibule is eliminated. In general, the apparatus comprising the present invention involves a pair of pivoted or swinging hollow doors. Such doors are hinged to the vertical door jambs of the smokehouse with which the invention is associated, and are adapted to swing toward each other and into edge-to-edge alignment when closed, in the usual manner of swinging doors. In their closed position, the inner and outer door panels of each swinging door are sealed coextensively to the surrounding jambs, as well as to the door sill therebeneath, while the meeting edges of these door panels are sealed coextensively to each other respectively. The inner and outer panels of each door are maintained in spaced-apart relationship by means of perforate marginal frame members so that when the dors are closed, the panels thereof, in combination with the various jambs and the door sill, establish a sealed space coextensive with the smokehouse door opening. Simplified means are provided for evacuating this space of any smoke-laden air which may infiltrate thereinto and, accordingly, a blower is mounted directly on the inside panel of one of the two swinging doors and has its intake opening in communication with the space. The blower is driven by an electric motor which is mounted on the outside panel of the one door, the drive shaft of the motor and the driven shaft of the blower being in axial alignment and coupled together within the space between the two panels of the one door. Since the blower is disposed within the closed smokehouse when the doors are closed, the smoke-laden air which is withdrawn by the blower from the space between the door panels is discharged directly back into the smokehouse interior.

By the arrangement heretofore mentioned, no modification of the smokehouse structure proper is required other than the application thereto of the door assembly embodying the present invention. Therefore, the invention may be designed as original equipment or it may readily be installed upon an existing smokehouse without appreciable modification thereof. Since the need for hollow jamb structures and a duct arrangement leading therefrom is eliminated, a very material reduction in the cost of equipment and in the cost of installation is effected.

The provision of a control apparatus or system for smoke exacuation from in and around smokehouse doors as briefly outlined above being the principal object of the invention, numerous other objects and advantages will readily become apparent from a consideration of the following detailed description.

In the accompanying two sheets of drawings forming a part of this specification, one illustrative embodiment of the invention has been shown.

In these drawings:

FIG. 1 is a fragmentary front elevational view, partly in section, of a battery of smokehouses embodying the principles of the present invention;

FIG. 2 is a front elevational view of the front door frame of one of the smokehouses of FIG. 1, showing the doors installed therein and in a partially open position;

FIG. 3 is a sectional view taken on the line 3—3 of FIG. 1;

FIG. 4 is a sectional view taken on the line 4—4 of FIG. 1;

FIG. 5 is a sectional view taken on the line 5—5 of FIG. 1; and

FIG. 6 is a fragmentary inside or elevational view of a portion of one of the doors showing the blower operatively installed thereon.

Referring now to the drawings in detail, and in particular to FIG. 1, there has been disclosed therein a battery of individual smokehouses 10 which, except for the door constructions thereof, may be of conventional design and construction. The product-treatment apparatus whereby the meat products are subjected to temperature and humidity changes and to the application of smoke in prescribed densities, and which usually are contained principally within the confines of the smokehouses 10, have not been illustrated herein since they are related to the apparatus of the present invention only in an indirect way. For a detailed disclosure of a smokehouse having such product-treatment apparatus, reference may be had to United States Letters Patent No. 2,625,095, granted to me on January 13, 1953. For purposes of disclosure of the present invention, it is deemed sufficient to illustrate only the smokehouse shell, i.e., the enclosure-defining walls, the framework therefor, and the floor foundation. Accordingly, each smokehouse 10 involves in its general organization a pair of side walls 12 and 14, a front wall 16, a rear wall 18, and a top wall or ceiling 20. The various walls, together with the floor or foundation structure 22, define therebetween a smokehouse enclosure 24 in which various food products are treated in a prescribed manner. The smokehouse walls are of a composite nature, the front, side, and rear walls including inner and outer wall panels 26 and 28 between which there is disposed suitable insulating material 31. The top wall 20 also is of a composite nature and the details thereof will be set forth presently. The inner wall panels 26 are preferably formed of stainless steel. The disclosure of the various smokehouse walls herein is merely exemplary and it will be understood that other forms of wall structures which differ widely in their characteristics may be employed without affecting the nature of the invention. The front wall 16 of each smokehouse 10 is provided with the usual rectangular door opening 32 by means of which access to the smokehouse enclosure 24 may be had for the purpose of introducing untreated food products into the enclosure and for removing the treated products therefrom. The arrangement of parts thus far described is purely conventional in its design and construction and no claim is made herein to any novelty associated with the same, the novelty of the present invention residing rather in the closure means for the door opening 32 and the pneumatic evacuation apparatus or system therefor whereby the smoke-laden atmosphere normally maintained within the enclosure 24 under predetermined super-atmospheric pressure is prevented from exfiltration through the door opening 32 and into the interior of the building within which the smokehouse is installed.

The rectangular door opening 32 is bounded by a generally rectangular door frame 34 which provides opposed vertical door jambs 36 and 38 (see FIG. 3), a horizontal top jamb 40 (see FIG. 4), and a horizontal lower sill 42. The door frame 34 is adapted to support within the opening 32 a door assembly including a pair of cooperating swinging doors 44 and 46. The latter are swingable between open positions wherein they extend outwardly away from the front wall 16 and closed positions wherein they extend in meeting edge-to-edge relationship and lie within the general plane of the front wall 16 and close the opening 32 therein.

The doors 44 and 46 are hinged to the front wall 16 on opposite sides of the door opening 32 by means of conventional strap hinge assemblies 48 including supporting brackets 50 on the outer panels 28 outside the smokehouse and hinge straps 52, the arrangement being such that the doors 44 and 46 may swing completely out of the door opening 32 for full unimpeded access to the smokehouse enclosure or interior for loading or unloading purposes. In the closed positions of the doors 44 and 46, the meeting edge regions of the same are maintained in registry by means of a latch assembly 54 including an outside latch handle 56, an inside latch handle 58, a connecting bolt 60, and a latch bracket 62.

The two doors 44 and 46 are similar in their design and construction and each consists of inner and outer door panels 70 and 72, respectively. These panels 70 and 72 are maintained in slightly spaced apart relationship by means of marginal frame members including vertical side members 74 and horizontal top and bottom members 76. Each of the frame members 74 and 76 is generally of channel-shaped configuration and includes side flanges 78 having inturned outer edges 80 and an interconnected perforate web 82 having a series of longitudinally spaced perforations 83 therein. The four frame members have their open channel sides presented outwardly of the rectangular door structure. The sides of the inner and outer door panels 70 and 72 have inturned edges 84 which overlie the inturned edges 80 of the frame members, as best seen in FIGS. 3 and 4.

In the closed position of the two doors 44 and 46, the inner door panels 70 are sealed coextensively to their surrounding jamb and sill structure by means of rubber or other elastomeric sealing strips which are applied to the inturned edges 84 by adhesive or other means. These sealing strips include vertical strips 86 which extend along the proximate panel edges and are designed for sealing engagement with the adjacent vertical jamb, vertical sealing strips 88 which extend along the distal panel edges and are designed for sealing engagement with each other, horizontal top sealing strips 90 which are designed for sealing engagement with the top jamb 40, and bottom sealing strips 92 which are designed for sealing engagement with the door sill 42. The outer door panels 72 are adapted similarly to be sealed to the surrounding jamb and sill structure when the doors are closed by means of vertical and horizontal sealing strips corresponding to the sealing strips 86, 88, 90 and 92 and designated by the reference numerals 94, 96, 98 and 100, respectively.

It is to be noted at this point that, since the doors 44 and 46 are of the offset swinging type, the pairs of meeting vertical sealing strips 88 and 96 (see FIG. 3) are offset from each other by reason of a slight difference in the width of the panels upon which they are mounted. Because of this feature, no interference between the mating strips 88 will take place before the mating strips 96 come together in the closed position of the doors.

From the above description, it will be seen that when the two doors 44 and 46 are closed, the inner and outer panels thereof, in combination with the various sealing strips and the jamb and sill structure against which the sealing strips are applied, define an internal closed or sealed door vestibule or chamber 102. According to the present invention, novel means are provided for evacuating this inner door chamber 102 of any smoke-laden air which may be present therein by reason of infiltration from the smokehouse enclosure 24. Accordingly, to effect such evacuation of the door chamber 102, a blower 110 is mounted on the inner door panel 70 of the door 44 and is adapted to be driven by an electric motor 112 which is mounted on the outer panel 72 of the door 44. When the smokehouse doors 44 and 46 are closed, the blower 110 is disposed wholly within the smokehouse enclosure 24 while the motor 112 is disposed exteriorly of the smokehouse. Mounting or backing plates 114 are provided for the blower 110 within the door chamber 102, while similar backing plates 116 are provided for the motor 112. Both the blower and the motor are of conventional design. The blower includes a blower casing 120 having an air inlet or intake opening 122 in registry with an air exhaust opening 124 in the inner door panel 70. It also includes a discharge opening 126 in communication with the interior of the smokehouse, i.e., the enclosure 24. The blower 110 further includes the usual impeller 128 which is mounted upon a rotatable impeller shaft 130. The impeller shaft 130 projects horizontally through the air exhaust opening 124 and is coupled as at 132 to the motor shaft 134. The motor shaft 134 extends into the door chamber 102 through a hole 136 in the outer door panel 72, the two shafts 130 and 134 being in substantial axial alignment.

As shown in FIG. 4, a microswitch 140 is mounted on the front wall 16 adjacent to the door opening 32 and is adapted to be actuated by an actuating finger 142 which is carried by the door 44. The switch 140 is operatively and electrically connected to the motor by suitable flexible leads (not shown) and is adapted, upon closure of the doors 44 and 46, to energize the leads and motor from a suitable source of energizing current. Upon opening of the doors 44 and 46, the supply of energizing current to the motor will be automatically discontinued.

In the operation of the apparatus or system, the sealing strips 86 and 94 (see FIG. 3) will, upon closure of the two doors 44 and 46, make sealing engagement with the vertical jambs 36 and 38 on opposite sides of the door opening 32; the sealing strips 90 and 98 (see FIG. 4) will make sealing engagement with the door sill 42; and the pairs of sealing strips 88 and 96 (see FIG. 3) will make sealing engagement with each other. Since the inner and outer door panels 70 and 72 are maintained in their spaced relationship by means of the perforate marginal frame members 74 and 76, the four panels, the various sealing strips, and the door jambs and sill together establish the previously mentioned closed door chamber 102 which is sealed from the smokehouse interior or enclosure 24, as well as from the ambient atmosphere surrounding the smokehouse. Upon such closure of the doors 44 and 46, the finger 142 (see FIG. 4) will engage the microswitch 140 and establish an electrical circuit for the motor 112, whereupon the motor will be energized and the blower 110 operated. Air will be drawn from the door chamber 102 through the air exhaust opening 124 provided in the inner door panel 70 and will enter the blower casing 120 through the blower inlet or intake opening 122 and will be discharged through the blower discharge opening 126 into the smokehouse enclosure 24. The door chamber 102 will thus be placed under subatmospheric pressure and, in the event of an imperfect seal between any of the various sealing strips in associated relation with the outer door panels 72, air will be drawn into the chamber 102 around the door edges at the point of seal failure so that exfiltration of air from the chamber 102 will be positively precluded. Any smoke-laden air which may find its way into the door chamber 102 around the edges of the inner door panels 70 will be drawn from the chamber and returned to the smokehouse interior by the blower 110 and no trace of this smoke-laden air will escape to the atmosphere surrounding the smokehouse.

The invention is not to be limited to the exact arrangement of parts shown in the accompanying drawings or described in this specification as various changes in the details of construction may be restorted to without departing from the spirit of the invention. For example, while the blower 110 and the motor 112 have been shown and described herein as being mounted on the inside and outside respectively of the door 44 and in axial alignment, and with the power train between these two instrumentalities extending through the door assembly, it is within the purview of the invention to mount the motor on the inside of the door adjacent to the blower and to establish a lateral power train between the same. Obviously, the motor and blower may be mounted on either the door 44 or the door 46 since, in either case, their function remains unaltered. While the inside and outside door panels 70 and 72 are disclosed herein as being maintained in their spaced relationship by perforated marginal channel-shaped frame members 74 and 76, various forms of structural spacer members are contemplated. The marginal frame members 74 and 76 afford a convenient rigidifying frame structure for the doors as a whole, but insofar as affording coextensive communication of the areas which exist in the marginal regions of the doors with the inner regions of the door chamber 102 in the vicinity of the blower intake opening 122, various forms of open latticework or frame structure will suffice. The illustrated details of the latch assembly 54 and of the hinge assemblies 48 are purely exemplary and may be varied extensively as desired. Finally, although the evacuation apparatus or system has been disclosed in connection with a pair of swinging doors, it is contemplated that the system may be applied without appreciable modification to a smokehouse door opening employing a single such door or to a door opening having a single sliding door or dual sliding doors. Therefore, only insofar as the invention has particularly been pointed out in the accompanying claims is the same to be limited.

Having thus described the invention what I claim as new and desire to secure by Letters Patent is:

1. In a smokehouse for treating food products and embodying, in combination, vertical walls, a ceiling and a floor defining together a normally closed smokehouse enclosure for the food products to be treated, one of said walls including a door frame defining a door opening for the admission and removal of the food products to and from the enclosure, a door assembly mounted on said one wall and movable between an open position wherein the door opening is exposed and a closed position wherein the door assembly is disposed within and serves to close the door frame, said door assembly, when in its closed position, defining in combination with the door frame an internal door chamber, a power-operated blower mounted on said door assembly and movable bodily therewith, said blower having an air inlet in communication with said internal door chamber and being adapted when placed in operation in connection with the use of the smokehouse to evacuate air from said door chamber and maintain the same under subatmospheric pressure, thereby preventing exfiltration of any smoke-laden air which may have infiltrated into the door chamber from said smokehouse.

2. In a smokehouse for treating food products, the combination set forth in claim 1 and wherein the blower is mounted on the inner side of said door assembly and is disposed substantially entirely within the smokehouse enclosure when said door assembly is in its closed position.

3. In a smokehouse for treating food products, the combination set forth in claim 1 and including, additionally, an electric motor mounted on said door assembly and movable bodily therewith, and means operatively connecting the motor and blower in driving relationship.

4. In a smokehouse for treating food products, the combination set forth in claim 3 and wherein the blower is mounted on the inner side of said door assembly and is disposed substantially entirely within the smokehouse enclosure when said door assembly is in its closed position, the electric motor is mounted on the outer side of said door assembly, and the connecting means extends through the door assembly.

5. In a smokehouse for treating food products, the combination set forth in claim 3 and wherein the blower is mounted on the inner side of said door assembly and is disposed substantially entirely within the smokehouse enclosure when the door assembly is in its closed position, the electric motor is mounted on the outer side of said door assembly and has a motor shaft projecting into the door chamber, and the blower has an impeller shaft which projects into the door chamber, is in axial alignment with the motor shaft, and has coupling means between it and the motor shaft.

6. In a smokehouse for treating food products and embodying, in combination, upstanding walls, a ceiling, and a floor defining a smokehouse enclosure for food products to be treated, one of said walls having a rectangular door opening therein for the admission and removal of the food products with respect to the enclosure, vertically extending side jambs, a horizontal top jamb and a horizontal floor sill surrounding said door opening, a door assembly mounted on said one wall and movable between an open position wherein the door opening is exposed and a closed position wherein the door assembly is disposed within and serves to close said door opening, said door assembly including spaced apart inner and outer door panels, which, when the door assembly is in its closed position, have their marginal edges in sealing engagement with said jambs and sill coextensively around the door opening, thus defining, in combination with said jambs and sill, an internal door chamber, one of said door panels being formed with an air exhaust opening therein in communication with said door chamber, a power-operated blower mounted on said one door panel and having an air inlet in communication with said door chamber through said air exhaust opening, said blower, when placed in operation in connection with the use of the smokehouse, being adapted to evacuate smoke-laden air from said door chamber and maintain the same under subatmospheric pressure, thereby preventing any smoke-laden air which may have infiltrated into the door chamber around the edges of the inner door panel from exfiltrating from the door chamber around the edges of the outer door panel.

7. In a smokehouse for treating food products and embodying, in combination, upstanding walls, a ceiling, and a floor defining a smokehouse enclosure for food products to be treated, one of said walls having a rectangular door opening therein for the admission and removal of the food products with respect to the enclosure, vertically extending side jambs, a horizontal top jamb and a horizontal floor sill surrounding said door opening, a door assembly mounted on said one wall and movable between an open position wherein the door opening is exposed and a closed position wherein the door assembly is disposed within and serves to close said door opening, said door assembly including spaced apart inner and outer door panels, which, when the door assembly is in its closed position, have their marginal edges in sealing engagement with said jambs and sill coextensively around the door opening, thus defining, in combination with said jambs and sill, an internal door chamber, said inner door panel being formed with an air exhaust opening therein in communication with said door chamber, a power-operated blower mounted on said inner door panel and having an air inlet in communication with said door chamber through said air exhaust opening, said blower being movable bodily with the door assembly and, when the door assembly is in its closed position, being disposed wholly within the smokehouse enclosure, said blower, when placed in operation in connection with the use of the smokehouse, being adapted to evacuate smoke-laden air from said door chamber and maintain the same under subatmospheric pressure, thereby preventing any smoke-laden air which may have infiltrated into the door chamber around the edges of the inner door panel from exfiltrating from the door chamber around the edges of the outer door panel.

8. In a smokehouse for treating food products, the combination set forth in claim 7 and including, additionally, an electric motor mounted on one of said door panels and movable bodily with the door assembly, and means operatively connecting the motor and blower in driving relationship.

9. In a smokehouse for treating food products, the combination set forth in claim 8 and wherein said electric motor is mounted on the outer side of the outer door panel and the connecting means extends through the door chamber.

10. In a smokehouse for treating food products, the combination set forth in claim 8 and wherein the electric motor is mounted on the outer side of the outer door panel, the motor has a motor shaft projecting through the outer door panel and into the door chamber, the blower has an impeller shaft projecting into the door chamber through said air exhaust opening, and the motor an impeller shafts are in axial alignment and have coupling means between them and within the door chamber.

11. In a smokehouse for treating food products and embodying, in combination, upstanding walls, a ceiling, and a floor defining a smokehouse enclosure for food products to be treated, one of said walls having a rectangular door opening therein for the admission and removal of the food products to be treated, vertical side jambs, a horizontal top jamb, and a horizontal floor sill surrounding said door opening, a door assembly mounted on said one wall and including a pair of cooperating swinging doors, each of said doors being of the offset swinging type, said doors being movable between open positions wherein they are removed from said door opening and closed positions wherein they are disposed in edge-to-edge relationship within and serve to close the door opening, each door including spaced apart inner and outer rectangular door panels which, when the door is in its closed position, have vertical proximate side edges in sealing engagement with the adjacent vertical side jamb, horizontal top edges in sealing engagement with the horizontal top jamb, horizontal bottom edges in sealing engagement with the horizontal floor sill, and vertical distal side edges in sealing engagement with corresponding vertical distal side edges on the door panels of the other door, the panels of the two doors, when the latter are in their closed positions, in combination with said jambs and floor sill, defining an internal door chamber, one of said door panels being formed with an air exhaust opening therein in communication with said door chamber, a power-operated blower mounted on said one door panel and having an air inlet in communication with said door chamber through said air exhaust opening, said blower, when placed in operation in connection with the use of the smokehouse, being adapted to evacuate smoke-laden air from said door chamber and maintain the same under subatmospheric pressure, thereby preventing any smoke-laden air which may have infiltrated into the door chamber around the edges of the inner door panel from exfiltrating from the door chamber around the edges of the outer door panel.

12. In a smokehouse for treating food products, the combinations set forth in claim 11 and wherein the air exhaust opening is provided in the inner door panel of one of said doors.

13. In a smokehouse for treating food products, the combination set forth in claim 11 and wherein the air exhaust opening is provided in the inner door panel of one of said doors, the blower is driven by an electric motor mounted on the outer door panel of said one door, and the blower and motor are operatively connected in driving relationship by means extending through the door chamber.

14. In a smokehouse for treating food products, the combination set forth in claim 11 and wherein the air exhaust opening is provided in the inner door panel of one of said doors, the blower is driven by an electric motor mounted on the outer door panel of said one door, the motor has a motor shaft projecting into the door chamber, the blower has an impeller shaft projecting into said door chamber in axial alignment with said motor shaft, and the two shafts are connected in driving relationship by a coupling device in said door chamber.

No references cited.